US006763373B2

(12) United States Patent
Shiigi

(10) Patent No.: US 6,763,373 B2
(45) Date of Patent: *Jul. 13, 2004

(54) METHOD AND SYSTEM FOR CREATING AND SENDING HANDWRITTEN OR HANDDRAWN MESSAGES

(75) Inventor: Clyde Shiigi, Aioa, HI (US)

(73) Assignee: Datahouse Labs, Inc., Honolulu, HI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/436,722

(22) Filed: May 12, 2003

(65) Prior Publication Data

US 2003/0195976 A1 Oct. 16, 2003

Related U.S. Application Data

(63) Continuation-in-part of application No. 09/978,472, filed on Oct. 15, 2001, now Pat. No. 6,564,249, which is a continuation-in-part of application No. 09/687,351, filed on Oct. 11, 2000, now Pat. No. 6,304,898.
(60) Provisional application No. 60/159,636, filed on Oct. 13, 1999.

(51) Int. Cl.[7] ............................................. G06F 13/00
(52) U.S. Cl. .................. 709/206; 709/219; 719/311; 719/329
(58) Field of Search ................................. 709/203, 206, 709/217, 219, 227; 719/311, 328, 329

(56) References Cited

U.S. PATENT DOCUMENTS

| | | | |
|---|---|---|---|
| 5,426,594 A | * | 6/1995 | Wright et al. |
| 5,546,538 A | * | 8/1996 | Cobbley et al. ............ 709/203 |
| 5,726,669 A | * | 3/1998 | Obata et al. ................... 345/2 |
| 5,818,447 A | * | 10/1998 | Wolf et al. ................. 345/335 |
| 5,880,740 A | * | 3/1999 | Halliday et al. ............ 345/435 |
| 5,983,200 A | * | 11/1999 | Slotznick ..................... 705/26 |
| 6,003,007 A | * | 12/1999 | DiRienzo ....................... 705/4 |
| 6,054,990 A | * | 4/2000 | Tran ........................... 345/358 |
| 6,105,055 A | * | 8/2000 | Pizano et al. |
| 6,133,905 A | * | 10/2000 | Edo et al. ................... 345/156 |
| 6,198,809 B1 | * | 3/2001 | Disanto et al. ........... 379/93.23 |
| 6,212,535 B1 | * | 4/2001 | Weikart et al. ............. 707/513 |
| 6,360,252 B1 | * | 3/2002 | Rudy et al. ................. 709/206 |
| 6,396,481 B1 | * | 5/2002 | Challa et al. ............... 345/169 |
| 6,556,586 B1 | * | 4/2003 | Sipila ......................... 370/469 |
| 6,557,029 B2 | * | 4/2003 | Szymansky ................. 709/206 |

FOREIGN PATENT DOCUMENTS

| | | | | |
|---|---|---|---|---|
| EP | 0784349 A | * | 7/1997 | |
| GB | 2289555 A | * | 11/1995 | ............ G06F/3/00 |
| JP | 400124178 | * | 5/1998 | |
| JP | 410124178 | * | 5/1998 | |
| JP | Hei 10-260920 | | 9/1998 | |
| JP | 410260920 | * | 9/1998 | |
| JP | Hei 11-259930 | | 9/1999 | |
| WO | WO 9704578 A | * | 2/1997 | |

OTHER PUBLICATIONS

Lotus White Paper, "Real Time Collaboration Standards" dated Oct. 1999, Lotus Development Corp.

* cited by examiner

Primary Examiner—Viet D. Vu
(74) Attorney, Agent, or Firm—Leighton K. Chong; Ostrager Chong & Flaherty (HI)

(57) ABSTRACT

An electronic messaging system, and related method, employs a handwriting server component operable on a network with a messaging host server, and a client device operable with a handwritten messaging client connected to the network. The client device sets up a graphical data capture area into which a user can enter handwritten or handdrawn input through a suitable graphical input device. The handwritten or handdrawn input is captured and sent as pixel data or an attached graphics file in the supported network messaging protocol. The preferred form of the handwriting messaging component is a Java applet installed on the client device. The graphical input device can be a touch screen, pen input device, stylus pad, or attached drawing pad or mouse. The handwriting messaging client sets up a drawing editor/viewer that allows the user to compose, manipulate, send and view handwritten or handdrawn messages. The drawing editor/viewer can include a set of standard drawing tools and functions. In one disclosed embodiment, the handwritten messaging system is provided for MMS messaging on wireless or digital cellphone networks.

20 Claims, 14 Drawing Sheets

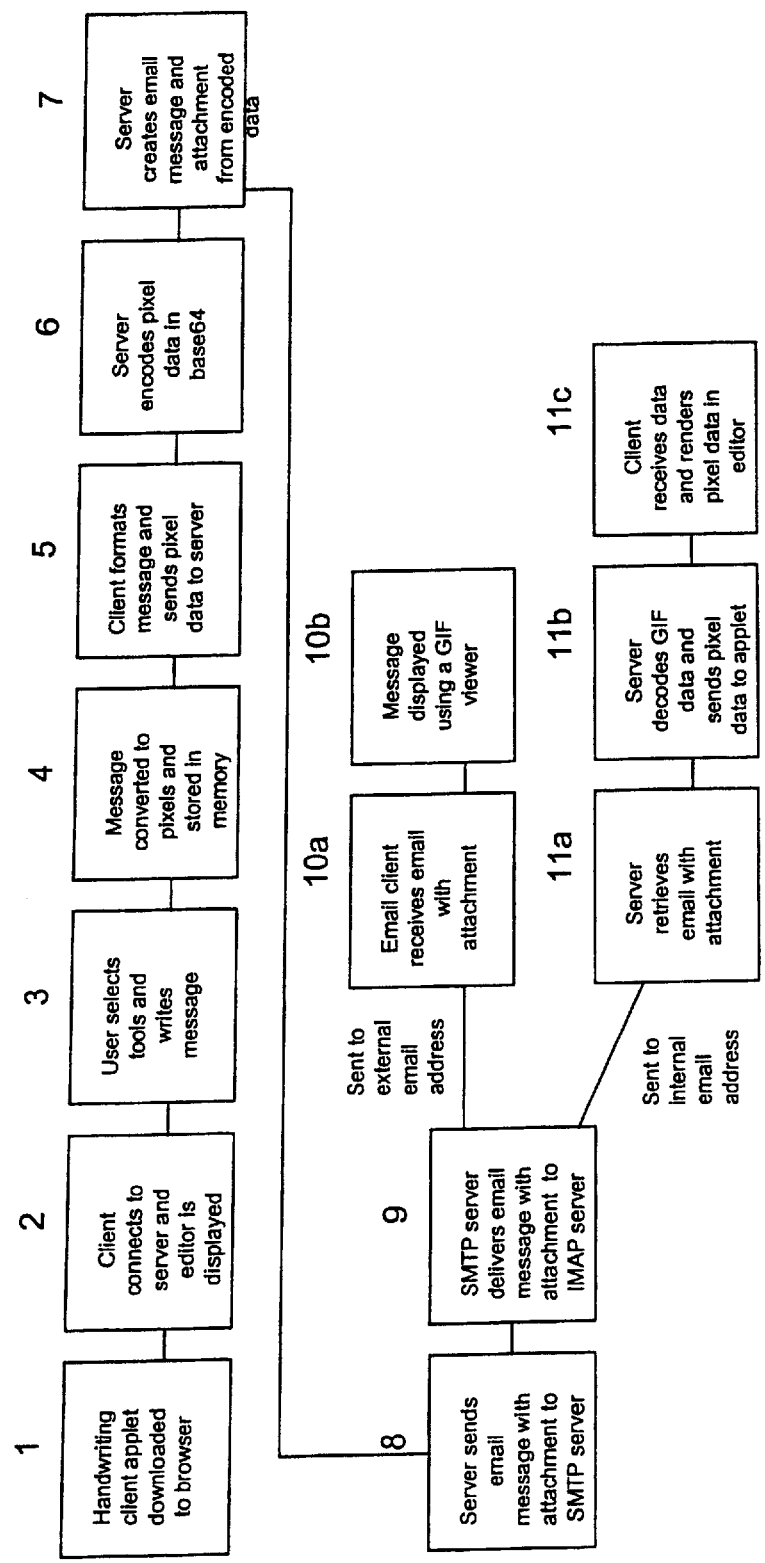
FIG. 2A  Handwriting Client and Handwriting Server Version

Handwriting Client and Handwriting Server Version

Handwriting Applet and Domino Server Version

Handwriting Client and Domino Server Version

Handwriting Applet and Real Time Server Version

Handwriting Client and Real Time Server Version

Handwriting Applet and Mail Server Version (Handwriting Client and Wireless Internet Email)

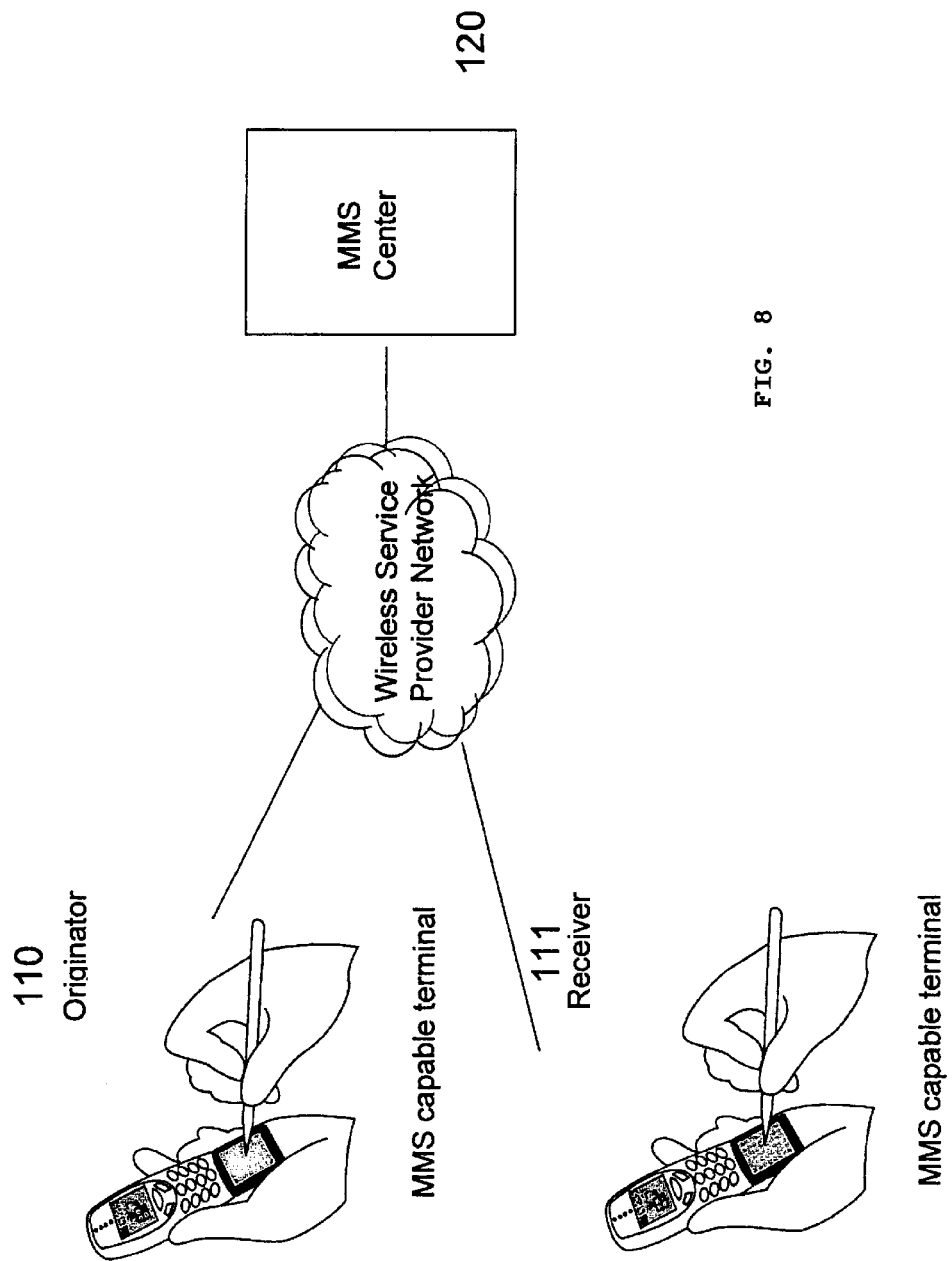

MMS Handwriting Messaging Version

MMS Handwriting Messaging Version

METHOD AND SYSTEM FOR CREATING AND SENDING HANDWRITTEN OR HANDDRAWN MESSAGES

This U.S. patent application is a continuation-in-part and claims the priority of U.S. patent application Ser. No. 09/978,472, filed on Oct. 15, 2001, entitled "Method and System for Creating and Sending Handwritten Message", now issued as U.S. Pat. No. 6,564,249, which was a continuation-in-part of U.S. patent application Ser. No. 09/687,351, filed on Oct. 11, 2000, entitled "Method and System for Creating and Sending Graphical Email", issued as U.S. Pat. No. 6,304,898 on Oct. 16, 2001, which was based on the priority of U.S. Provisional Application No. 60/159,636 filed on Oct. 13, 1999, entitled "Graphical Email Drawing and File Attachment System, all by the same inventor.

FIELD OF THE INVENTION

This invention relates to the processing of handwritten input in electronic messaging, and specifically to an electronic messaging system for handwritten or handdrawn messages.

BACKGROUND OF THE INVENTION

Electronic messaging is a general method for sending and receiving communications as digital data between computers on a network. The Internet has dramatically increased electronic messaging amongst millions of users on global data networks. Many diffferent forms of electronic messaging are being used to send and receive communications in a wide variety of forms of structured and unstructured data. Businesses make extensive use of electronic messaging to conduct business communications and transactions between trading partners. Electronic mail (or email) is a popular form of electronic messaging for communications between users. Typical email messages are composed of typed text or a combination of typed text and text or graphical files that are attached to the email message and opened with the appropriate processor or viewer. As the popularity of the Internet continues to grow worldwide, more and more people numbering in the billions are expected to use email for communications.

Recent advances in technology and standards have expanded the types and forms of devices that can connect to the Internet. In addition to dial-up and online connections between users computers and servers that provide information services and email services, many types of other devices are being connected to the Internet for communications purposes, including personal digital assistants (PDAs), text messaging pagers, digital cellphones enabled with Wireless Application Protocol (WAP), advanced digital game machines, digital set top boxes for televisions, and even CPU-controlled household appliances. Many of these devices having Internet access do not require or are not adapted to use a keyboard for inputting data. While there are other types of input devices that enable handwritten or handdrawn input, such as touch sensitive screens, stylus pads, optical pens, etc., they have not been enabled for electronic messaging and other communication functions.

Handwritten or handdrawn input can be more convenient to use than a keyboard and, in many situations, would be uniquely necessary for certain types of communication. Many written language systems, such as Japanese, Korean, Chinese, Arabic, Thai, Sanskrit, etc., use cursive or ideographic characters that are very difficult to input by an equivalent method via keyboard. For example, text input of the Japanese written language requires the use of simulated phonetic spelling methods (romanji, hiragana, and/or katakana) to select from thousands of possible kanji characters. Many mobile devices such as PDAs do not have keyboards due to their limited size and form, or would become cumbersome to use if a keyboard must be attached or if text must be entered by cursoring through displays of softkeys. Disabled or hospitalized people who have limited hand mobility may not be able to use a keyboard effectively. Current legal and financial institutions still rely heavily on the use of handwritten signatures to validate a person's unique identity. And in many instances, people find it much easier to communicate an idea by drawing a picture, or prefer handwriting or drawing a picture as more personal or expressive communication than typing text on a keyboard.

There is thus a clear need for an electronic messaging system that allows people to communicate with their own handwriting or drawing, as contrasted to typed text. This need will continue to grow as the numbers of global users and Internet-connected devices increase. None of the current electronic messaging methods allow a user to compose, manipulate, store, send, receive, and view a handwritten or handdrawn email message.

SUMMARY OF THE INVENTION

In accordance with the present invention, an electronic messaging system, and related method, comprises a handwriting server component operable on a server computer on a wireless or cellphone network for receiving a handwritten message sent from a user to be delivered to a recipient to whom it is addressed, and a handwriting client component operable with a messaging client on a wireless or cellphone device for setting up a graphical data capture area into which a user can enter handwritten or handdrawn input through a suitable graphical input device, and for capturing the handwritten or handdrawn input as graphical data and sending it via the network to the server component for handling as a handwritten message. The client component is also operable for setting up a graphical data viewing area for viewing the graphical data sent with the handwritten message handled by the server component.

In a preferred embodiment, the handwriting messaging component is a Java applet installed on a Java-enabled wireless or cellphone device. The graphical input device can be a touch screen, pen input device, stylus pad, or an attached drawing pad. The handwriting messaging component sets up a drawing editor/viewer that allows the user to compose, manipulate, and view handwritten or handdrawn messages. The editor/viewer can include standard drawing tools such as those for line size, color, paper and border selection, circle and polygon shapes, spray paint, flood fill, color palette, undo and scrolling functions.

Other objects, features, and advantages of the present invention will be described in further detail below, with reference to the following drawings:

BRIEF DESCRIPTION OF DRAWINGS

FIG. 8 is a schematic illustration of the handwritten messaging system operable on a wireless or cellphone device network.

DETAILED DESCRIPTION OF INVENTION

In the following description, exemplary embodiments of the handwritten or handdrawn messaging system of the present invention are provided for different network environments, such as email messaging on the Internet, real-time (instant IM) messaging on IM networks, and MMS messaging on wireless or digital cellphone networks. This U.S. patent application is directed particularly to the latter network environment.

Figure 1A:
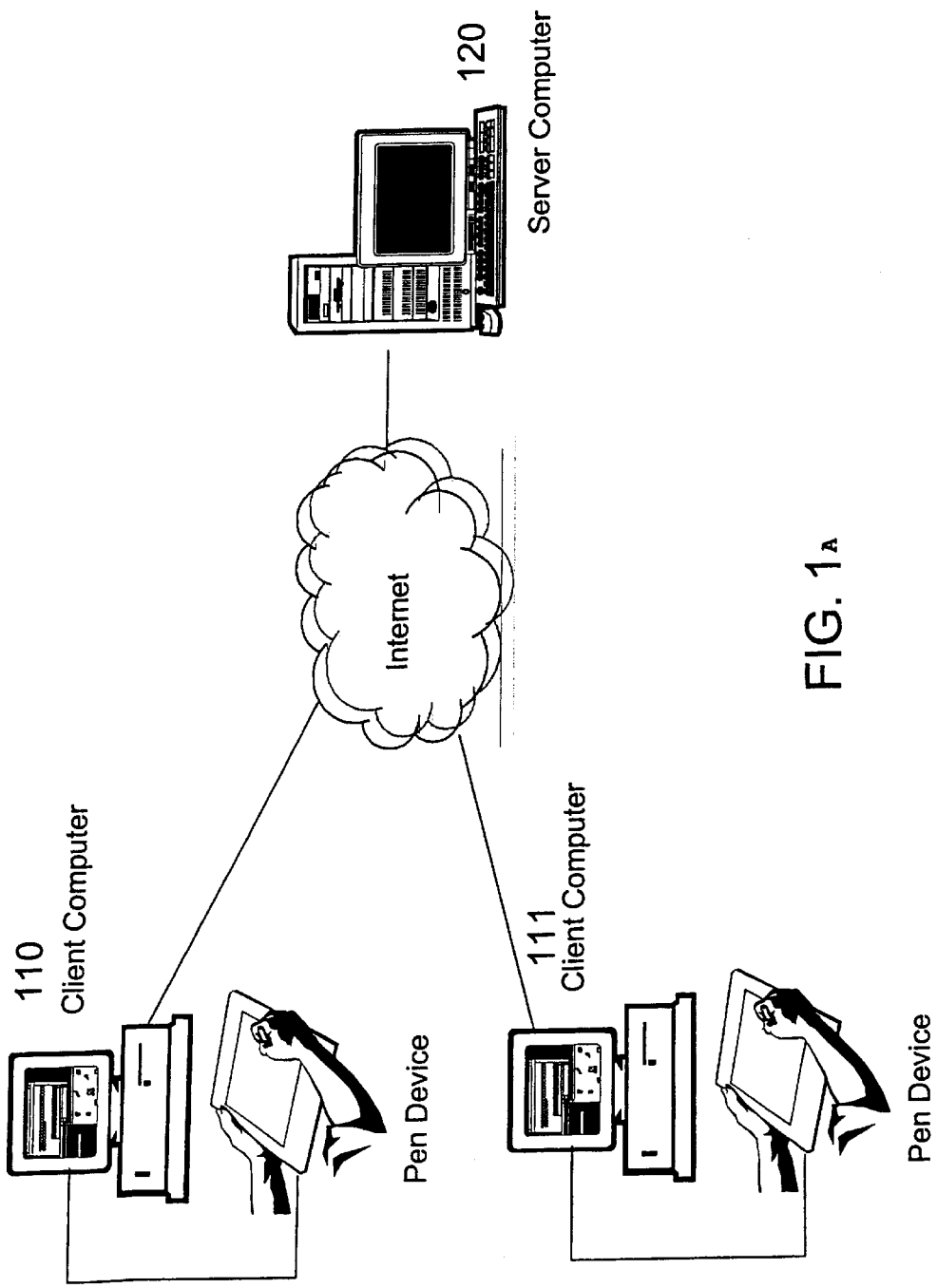
FIG. 1A is a diagram illustrating the connection of client computers with pen devices to an email server computer on the Internet.

Referring to FIG. 1A, the general system architecture of the handwritten messaging system (and related method) is illustrated for email networks. A plurality of client computers 110, 111, etc., adapted for handwriting or handdrawing input are used by users to connect via a network (the Internet or any type of multi-user network) to a server computer 120. In the context of this description, the term "computer" is used to refer to any type of data processing device which is capable of executing digitally programmed instructions. The term "client computer" refers to any computer capable of connecting to a server computer on a network and performing a function with the server computer. An example of a typical computer for use on a network is a Pentium or higher class PC with Windows operating system of Microsoft Corp., Redmond, Wash., or Macintosh or higher class PC with Macintosh OS operating system of Apple Computer Corp., Cupertino, Calif. However, a client computer can also be a wide range of other network-connectable computing devices such as personal digital assistants (PDAs), text messaging pagers, digital cellphones enabled with Wireless Application Protocol (WAP), advanced digital game machines, digital set top boxes for televisions, and even CPU-controlled household appliances. The term "server computer" is used to refer to any type of data processing device that is connected to a node on a network for providing services to client devices on the network.

The client computer 110 is what a sender or recipient uses to compose and send, and receive and view, handwritten or handdrawn email messages. The client computer preferably is of the type that can run a standard web browser which supports an email client, such as those compatible with Microsoft IE 4.x browsers, licensed by Microsoft Corp., of Bellevue, Wash., or Netscape 4.x web browsers, licensed by America Online, Inc., of Fairfax, Va. The standard browsers preferably also support the Java Virtual Machine, Version 1.2 or higher, licensed by Sun Microsystems, of Mountain View, Calif., which is the preferred platform for programming and distributing the handwriting messaging software in the present invention as Java applets or Java-based plug-ins to the browsers. The standard web browsers connect to the network using any standard protocol recognized on the network. For example, on the Internet standard web browsers use the TCP/IP protocol. Connection to the network may be made by modem over a dial-up telephone line, DSL line, cable modem, Internet access connection, or a local area network.

The handwriting or handdrawing input device can be a touch screen, pen input device, stylus pad, optical pointer, mouse, etc., which is attached to the client computer to allow the user to handwrite or handdraw messages in a graphical data capture area of the email client of the web browser set up for that purpose. Examples of such input devices include the Wacom Graphire™ pen tablet sold by Wacom Technology Corporation, of Seattle, Wash., which attaches to the client computer via a serial or USB port. The pen device could also be integrated with a touch screen, e.g., as also offered by Wacom, or part of the computer itself, e.g., as offered with the Sharp SJ5, Copernicus and Pro Stations sold by Sharp Corporation, of Tokyo, Japan.

The server computer 120 is a central processing server for the graphical email system. It is connected to the network to communicate with the client computers using, for example, the TCP/IP protocol on the Internet. In the preferred implementation, the server computer stores the graphical email handling software that is downloaded to the client computers. It authenticates users against a directory of authorized users and manages and tracks the state of concurrent user sessions. For sending and receiving graphical email, it communicates with the graphical email software on the client computers. When a handwriting message is composed on the client computer, the server computer receives the graphical email message and stores it in a database. When a handwriting message is to be viewed by the client computer, the server computer fetches the graphical email message from the database and sends the message to the client computer for display as a handwriting image.

Figure 1B:
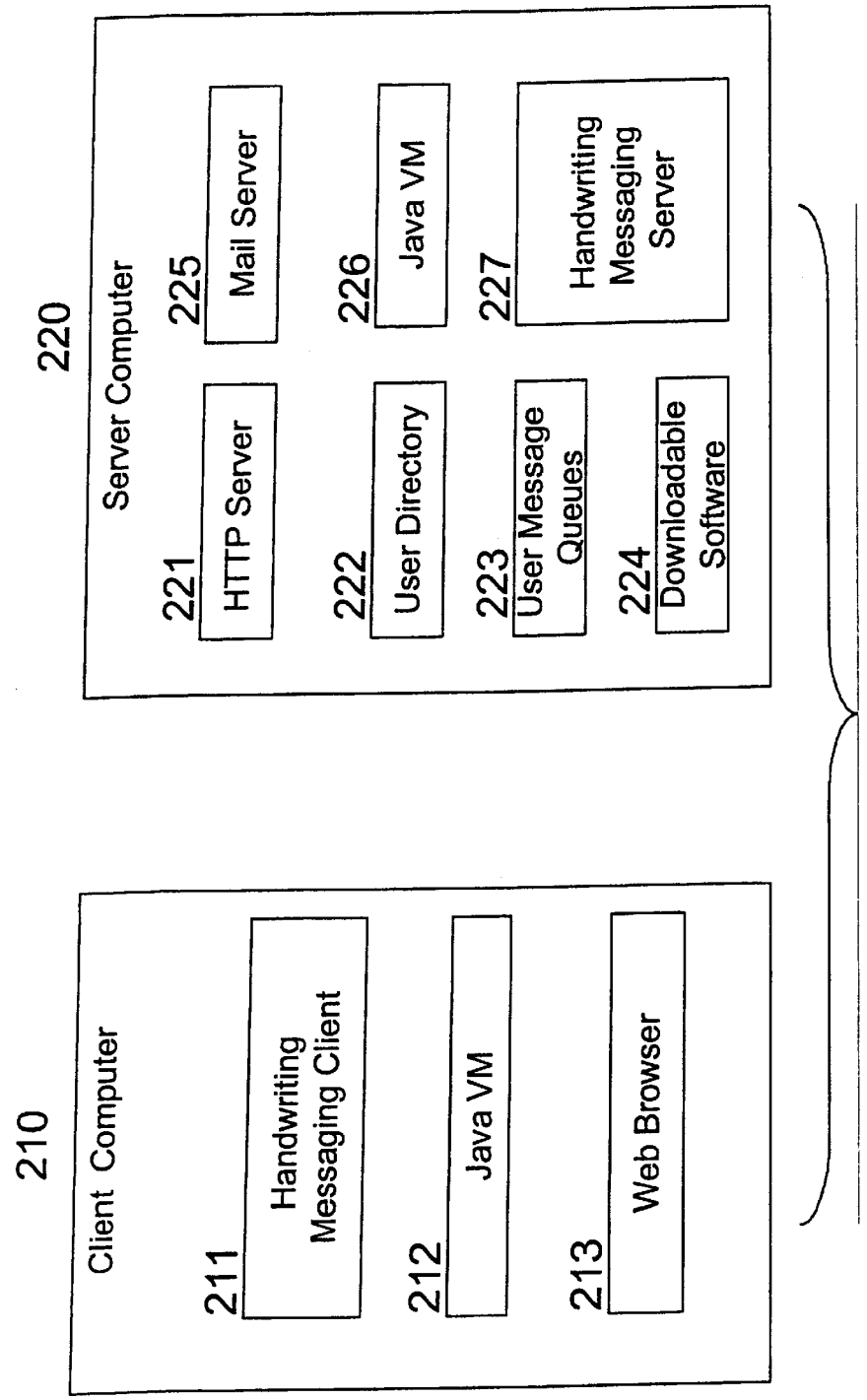
FIG. 1B shows the email handling components of the client and server computers.

Referring to FIG. 1B, the graphical email handling components of the preferred system are illustrated. The client computer 210 includes a Handwriting Messaging Client 211 which handles sending and receiving graphical email messages, a Java Virtual Machine (VM) 212 which sets up the graphical data capture area and display area for the handwriting message, and the Web Browser 213 which provides the user interface for connecting to the Internet (or other network). There are two versions of the Handwriting Messaging Client software described below, i.e., a Java applet and a Java application version. The Java applet version is used for sending and receiving handwritten email messages via a server computer's mail server functions. The Java application version of the handwriting messaging client software is installed with the users' browsers for real-time messaging between users or via a real-time Java server. The client software includes a drawing editor/viewer for composing and viewing handwritten email messages, as well as the functions to communicate with a server in a server-client configuration.

The server computer 220 includes an HTTP Server Interface 221 for connection to the Internet, a User Directory 222 for identifying email addresses of authorized users, User Message Queues 223 for delivering received messages to users, a Downloadable Software Server 224 for downloading the graphical email software to client computers, a Mail Server Interface 225 for handling sent and received email, a Java Virtual Machine (VM) 226 which provides the platform for interacting with the users' graphical email software, and a Handwriting Messaging Server 227 which formats email messages using the graphical data captured by the software on the client computers. There are four versions of the Handwriting Messaging Server described below, i.e., a Handwriting Java Server Version, a Domino Server Version, a Real-Time Java Server Version, and an Internet Email Server Version.

Handwriting Java Client and Handwriting Java Server Version

Figure 2:
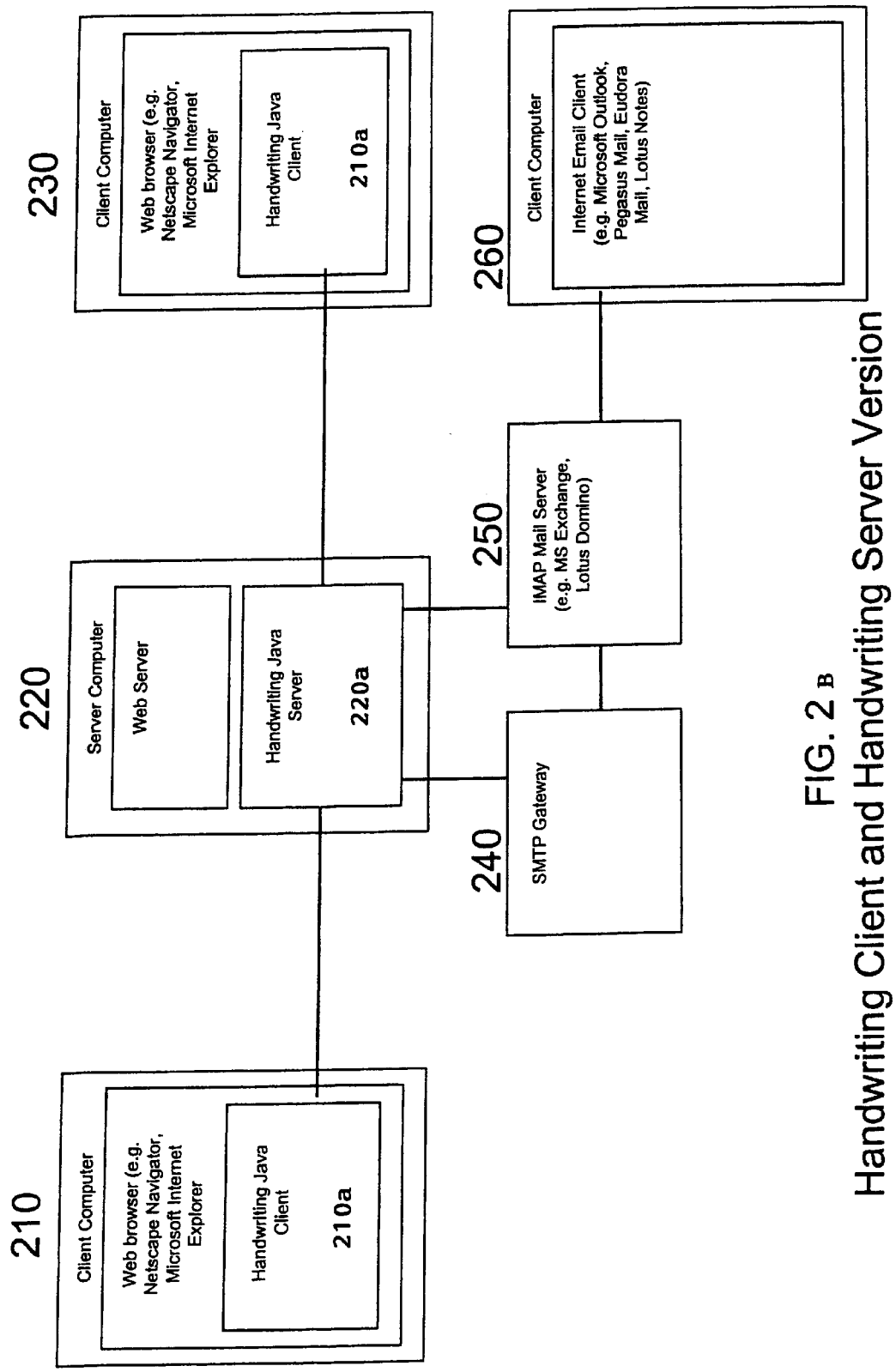
FIG. 2A is a process flow diagram of an SMTP server version of the graphical email system.
FIG. 2B is a schematic illustration of the network connections of this version of the graphical email system.

With reference to FIG. 2B, this version of the system uses both handwriting client and server software components along with the usual email server functions. A Handwriting Java Client 210a operates in a web browser (such as Netscape Navigator or Microsoft Internet Explorer) as a Java applet on the client computer 210. The applet 210a provides a drawing editor to compose and send handwritten email messages, and on the receiving end, also provides the drawing viewer to view the handwritten message. The implementation of a Java applet for the handwriting messaging function is described in further detail below. Generally, the use of a Java applet to provide a drawing application intended to run in a browser is known to those knowledgeable in this field. As one example, a Java applet used to set up a drawing editor in a browser for a "whiteboard" application run on an intranet is the SameTime™ whiteboard applet offered with Lotus™ Notes, a workgroup software suite distributed by Lotus Development Corp., of Cambridge, Mass., which is a division of IBM Corp., Armonk, N.Y.

A Java applet is created specifically for setting up a drawing editor/viewer operable with an email client running with a web browser for capturing, sending, receiving and viewing a handwriting or handdrawing email message. The Java applet consists of a set of modules which run the different messaging functions of the drawing editor/viewer. The data capture and sending module operates by first recognizing the handwriting input device connected to the client computer, then creating a temporary memory space for holding the input received from the input device, capturing the input signals from the input device (usually a series of coordinate data inputs representing time-sampled coordinate positions detected for the trace of the input device), converting the input signals to pixel data (screen coordinates, color, intensity), and displaying the pixel data in a display area or "panel" of the email client to show the handwriting or handdrawn image input by the user through the input device. The display allows the user sending a handwritten email message to verify what is being written, and is also the same display that allows a user receiving the handwritten email message to view the corresponding image. An example of a data capture and sending module according to the invention is illustrated in the source code listing appended hereto as Appendix I.

When the graphical email message is completed, the user addresses the message to a recipient and sends it. The Handwriting Java Client formats and sends the email message with the pixel data to the Handwriting Java Server component 220a on the server computer 220, which converts the pixel data to a GIF file attachment to a standard email body. The Handwriting Java Server component 220a communicates with an SMTP email gateway computer 240 to send email messages using the industry-standard SMTP Internet protocol. The SMTP email gateway sends the email messages to mail servers 250, such as an industry-standard IMAP (Internet Message Access Protocol) mail servers like MS Exchange or Lotus Domino on the Internet. Email recipients can retrieve their email from the mail servers 250 using a standard Internet email client 260, such as Microsoft Outlook, Pegasus Mail, Eudora mail, or Lotus Notes. When the graphical email is retrieved with a standard Internet email client, the handwritten drawing is viewed as a file attachment using a GIF viewer operates with the web browser. Email recipients on client computers 230 who have the Handwriting Java Client 210a in their web browser can receive their handwritten email messages directly. The graphical email message is retrieved from the Handwriting Java Server component 220a on the server computer 220 and displayed in the Handwriting Java Client viewer as a handwritten or handdrawn image.

With reference to FIG. 2A, the specific process steps involved with sending a handwritten email message and viewing it by the recipient are described in detail below:

1. The Handwriting Java Client software is downloaded from the Handwriting Java Server to the client computer through a web page that is displayed in a web browser.
2. The Handwriting Java Client software is initialized and establishes a connection to the Handwriting Java Server using the industry-standard TCP/IP and remote method invocation (RMI) protocols. After initialization is complete, the Handwriting Java Client software displays a drawing composition editor that is used to compose the handwritten message.
3. The handwritten message is composed by the user in a graphical data capture area set up by the drawing editor, selecting the appropriate writing and drawing tools, colors, and styles as offered in the Handwriting Java Client software.
4. While the user is drawing in the graphical data capture area, the pixel data representing the drawing is stored in local memory. When the graphical email message is completed, the user addresses the message to a recipient using Javascript fields on the web page in which the Java handwriting client is embedded.
5. When the user issues a "Send" command, the Handwriting Java Client formats the message and sends the pixel data to the Handwriting Java Server. The graphical message is still in GIF format at this time.
6. The Handwriting Java Server processes the graphical message data using standard base64 encoding. This turns the data into ASCII text that can be transmitted as standard email data packets by the Handwriting Java Server.
7. The Handwriting Java Server creates an outgoing email message that contains the encoded handwritten message as a GIF attachment.
8. The Handwriting Java Server sends the outgoing email message with GIF attachment via the SMTP (Simple Mail Transfer Protocol) gateway 240.
9. The SMTP gateway transfers the message to an IMAP mail server based on the recipient's address. The IMAP server allows clients running it to retrieve mail from the host mail server also running the protocol, similar to POP-3, but with extended capabilities. Recipients can open the email as a standard email message with a GIF attachment (steps 10a, 10b below) or with a Handwriting Java Client applet if downloaded to their web browser (steps 11a, 11b, 11c below).

10a. The IMAP server sends the email with the handwritten message as an attached encoded GIF file to an external email address for the recipient.

10b. When the recipient opens the email containing the attachment, the message can be displayed on their computer using a GIF viewer.

11a. The IMAP server sends the email with the handwritten message as an attached encoded GIF file to an internal email address, i.e., to an address on a server computer 220 that is running the Handwriting Java Server component 220*a*.

11b. The Handwriting Java Server decodes the attached GIF file into pixel data and sends it to the Handwriting Java Client applet running in the recipient's web browser.

11c. The Handwriting Java Client receives the pixel data from the Handwriting Java Server and renders the pixel data as a handwritten or handdrawn image in the drawing editor/viewer.

Handwriting Java Client and Domino Server Version

With reference to FIG. 3B, this version of the system uses the Handwriting Java Client 310*a* along with a Lotus™ Domino Server on the server computer 320. As before, the Handwriting Java Client 310*a* operates in a web browser as a Java applet on the client computers 310, 330. The applet 310*a* provides a drawing editor/viewer to compose and view handwritten messages. For sending and receiving email internally, the applet 310*a* communicates with the Domino Server on the server computer 320. The Domino server sends email messages among users with client computers running Java client software connected to the server's intranet. The Domino Server communicates with an SMTP email gateway computer 340 to send email messages externally using the SMTP Internet protocol. The SMTP email gateway sends the email messages to mail servers 350 on the Internet. External email recipients can retrieve their graphical email using a standard Internet email client 360. The handwritten drawing can then be viewed as a file attachment using a GIF viewer such as a web browser.

Figure 3A:
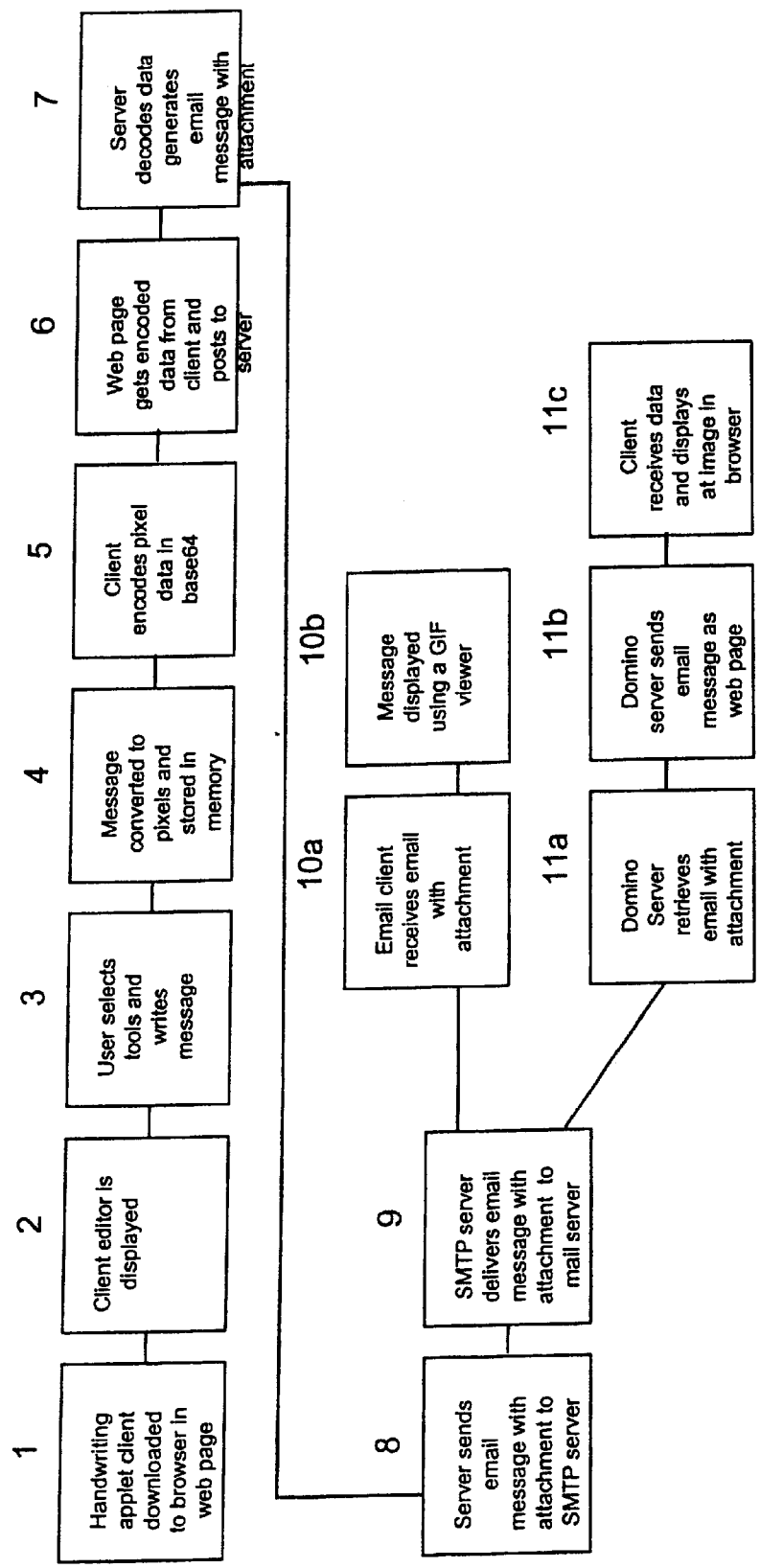
FIG. 3A is a process flow diagram of a Lotus™ Domino server version of the graphical email system.
Figure 3:
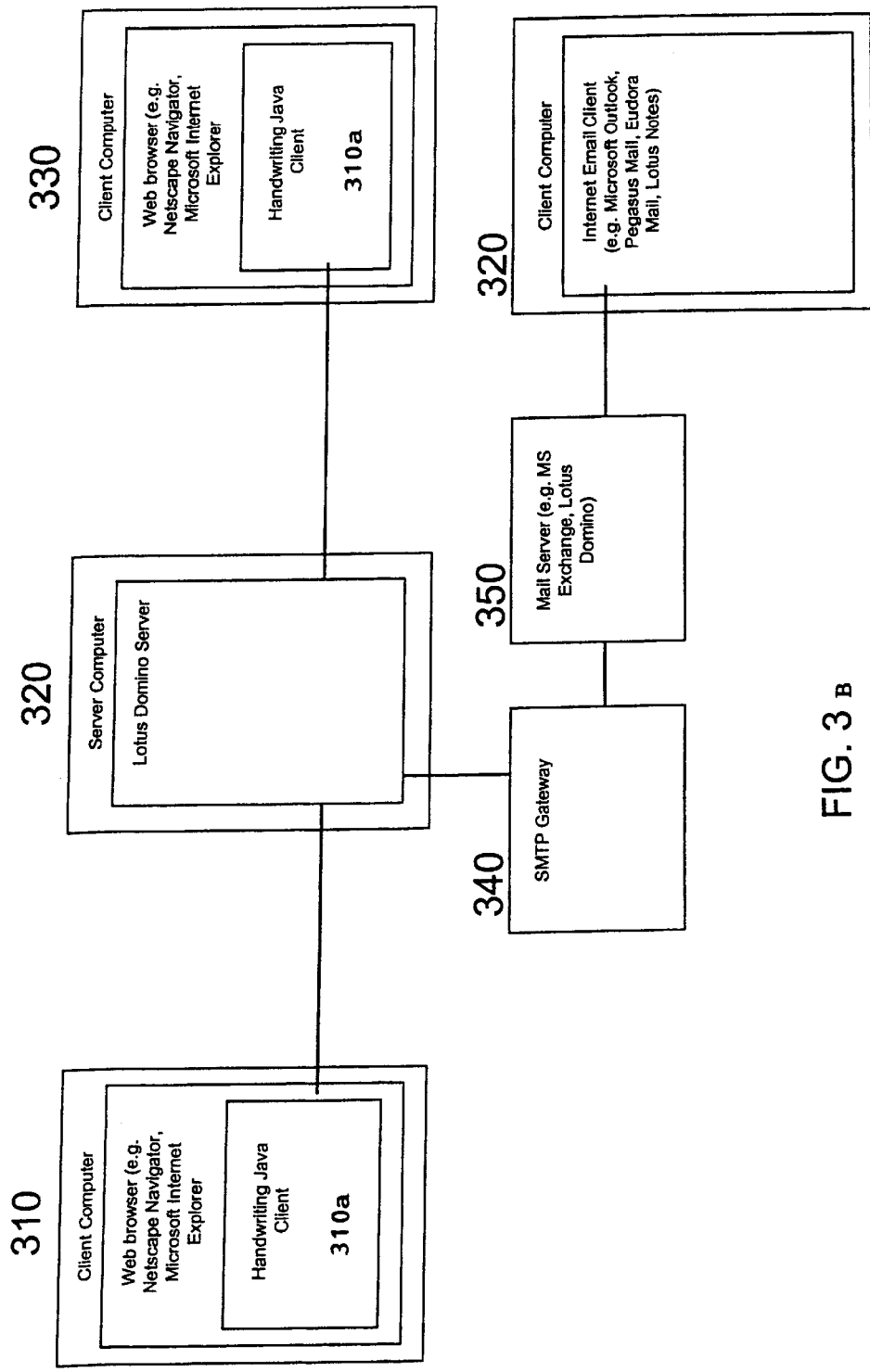
FIG. 3B is a schematic illustration of the network connections of this version of the graphical email system.

With reference to FIG. 3A, the process steps involved with sending a handwritten email message through a Domino Server and viewing it by the recipient are described in detail below:

1. The Handwriting Java Client software is downloaded from the Handwriting Java Server to the client computer through a web page that is displayed in a web browser.
2. The Handwriting Java Client software is initialized and establishes a connection to the handwriting Domino Server using the TCP/IP and remote method invocation (RMI) protocols. After initialization is complete, the Handwriting Java Client software displays a composition editor that is used to compose the handwritten message.
3. The handwritten message is composed by the user selecting the appropriate writing and drawing tools, colors, and styles.
4. While the user is drawing, the pixel data representing the drawing is captured in the input data area and stored in local memory. The user addresses the email message to a recipient using Javascript fields on the web page in which the Handwriting Java Client is embedded.
5. When the "Send" command is issued, the Handwriting Java Client encodes the pixel data in base64 format.
6. The Web page along with the encoded image is posted to the Domino Server using Javascript.
7. An agent on the Domino Server decodes the image and creates an email message with an attached GIF file.
8. The Domino server sends the email message with attachment to an external recipient's address via an SMTP (Simple Mail Transfer Protocol) gateway.
9. The SMTP gateway transfers the email message to a mail server, which routes the message to the recipient's email box.
10a. an external recipient's e-mail client retrieves the email message with the GIF attachment from an Internet email server.
10b. When the user (recipient of the email) opens the email containing the GIF attachment, the handwritten message in the attachment can be displayed using a GIF viewer.
11a. If the recipient has an internal email address handled by a Domino Server, the server retrieves the email message with the GIF attachment.
11b. The Domino Server sends the email message to the client computer as a web page when the client requests the page via their web browser email client.
11c. The client's web browser email client displays the handwritten message as an image.

Handwriting Java Client and Real Time Server Version

Figure 4:
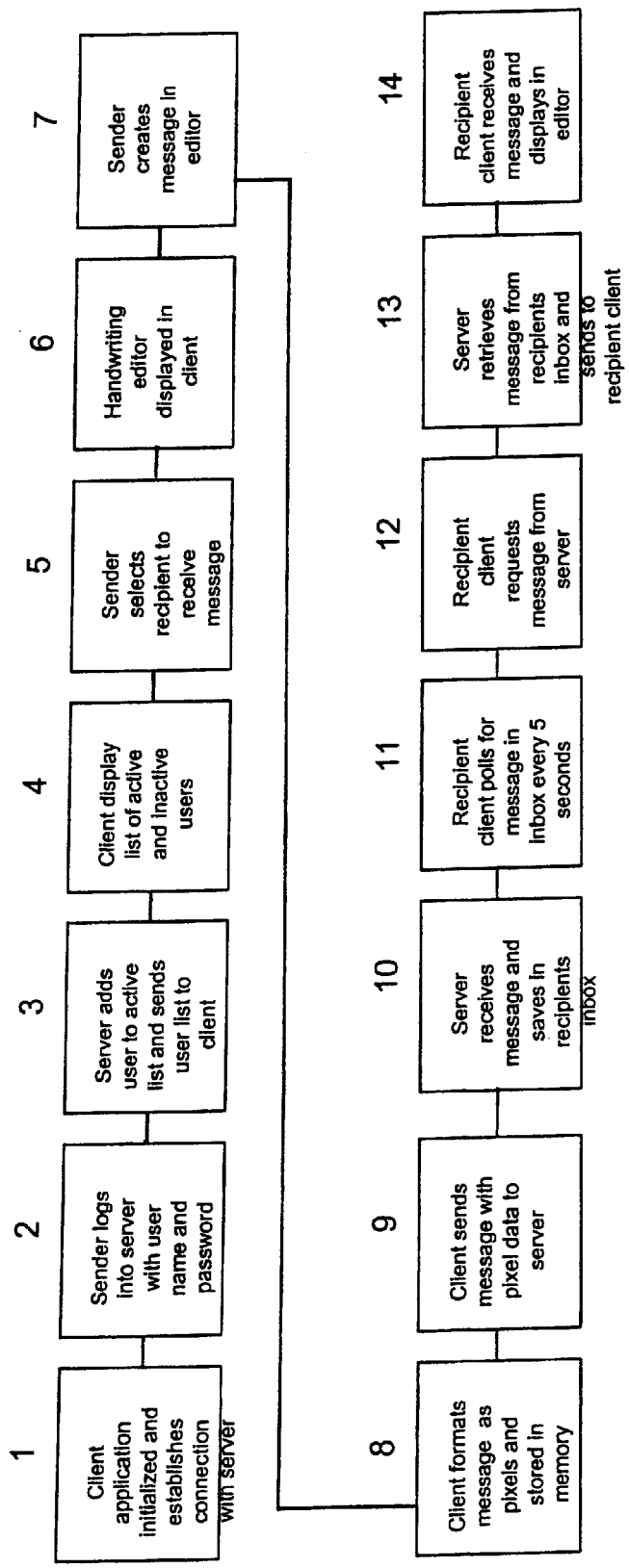
FIG. 4A is a process flow diagram of a real-time messaging server version of the graphical email system.
FIG. 4B is a schematic illustration of the network connections of this version of the graphical email system.
Figure 4B:
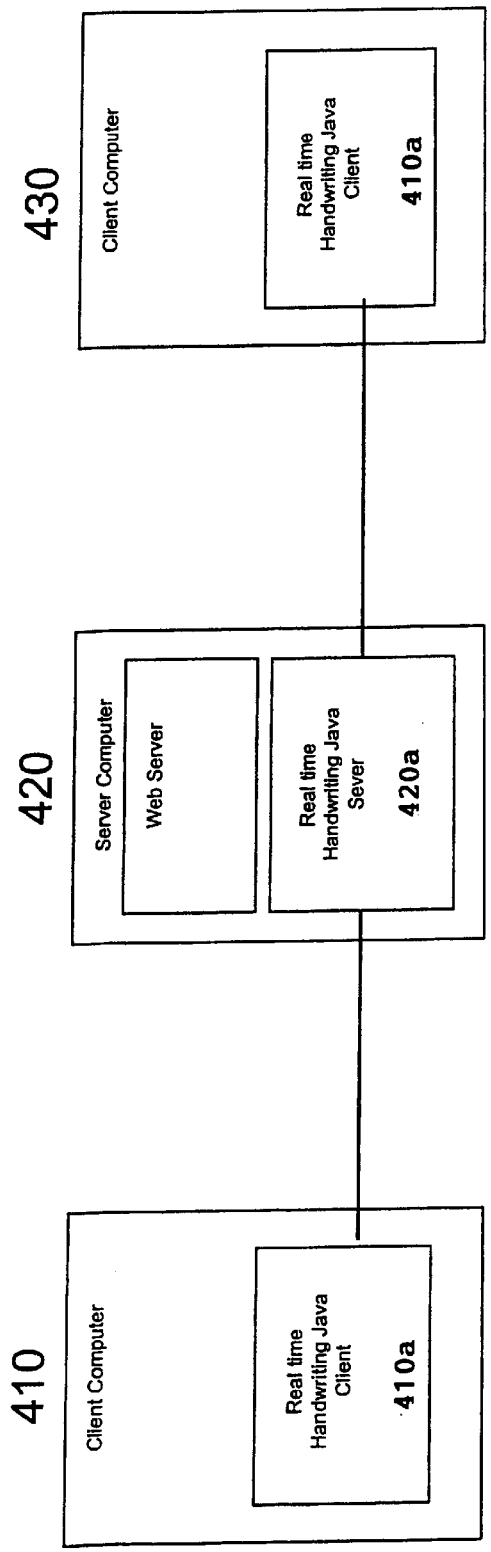

With reference to FIG. 4B, this version of the system uses the Handwriting Java Client with a Real Time Handwriting Java Server. As before, the Handwriting Java Client 410*a* operates in a web browser as a Java applet on the client computer 410, 430. The applet 410*a* provides a drawing editor/viewer to compose and view handwritten messages. The applet 410*a* communicates with the Real Time Java Server component 420*a* on a server computer 420. The receiving Handwriting Java Client is notified when an email message for that user has been sent to the Real Time Java Server, and retrieves the email message from the server. In this way, communication can take place using the Handwriting Java Client in near real-time. This version is useful for users using mobile communication devices, such as PDAs, WAP-phones, etc.

With reference to FIG. 4A, the process steps involved with sending a handwritten message through a Real-Time Handwriting Java Server and and viewing it by the recipient are described in detail below:

1. The client computer has a downloaded version of the Handwriting Java Client software, and establishes a connection with the server computer on which the Real Time Java Handwriting Server is running.
2. The client computer identifies the user to the server by entering a user name and password.
3. The server maintains a list of registered users, and a list of currently active users. When the client logs onto the server, the server looks up the user name and password in order to authenticate that person as a registered user, then the user is added to the list of active users.
4. The client computer displays a list of active and inactive users which is downloaded from the server.
5. The user clicks on a name from the list of active users to identify the user to whom they want to send a message.
6. After the user selects a name from the list of active users, the handwriting editor is displayed in the Handwriting Java Client.
7. The user creates a message by selecting the appropriate writing and drawing tools, colors, and styles.
8. The Handwriting Java Client formats the message and stores it as pixel data until it is ready to be sent.
9. The completed message is sent to the Real Time Java Handwriting Server in pixel format.

10. The server receives the message and puts it into a repository where it can be retrieved by the user to whom it is addressed.
11. All active client computers poll the repository on the server every five seconds to see if there are any messages for them.
12. When the Handwriting Java Client on the recipient's computer discovers a message in the repository, the client computer requests the message from the server.
13. The server retrieves the message from the repository and sends it to the client computer of the recipient.
14. The recipient's client computer displays the message in the Handwriting Java Client's drawing editor/viewer.

Handwriting Java Client and Internet Email Server Version

Figure 5:
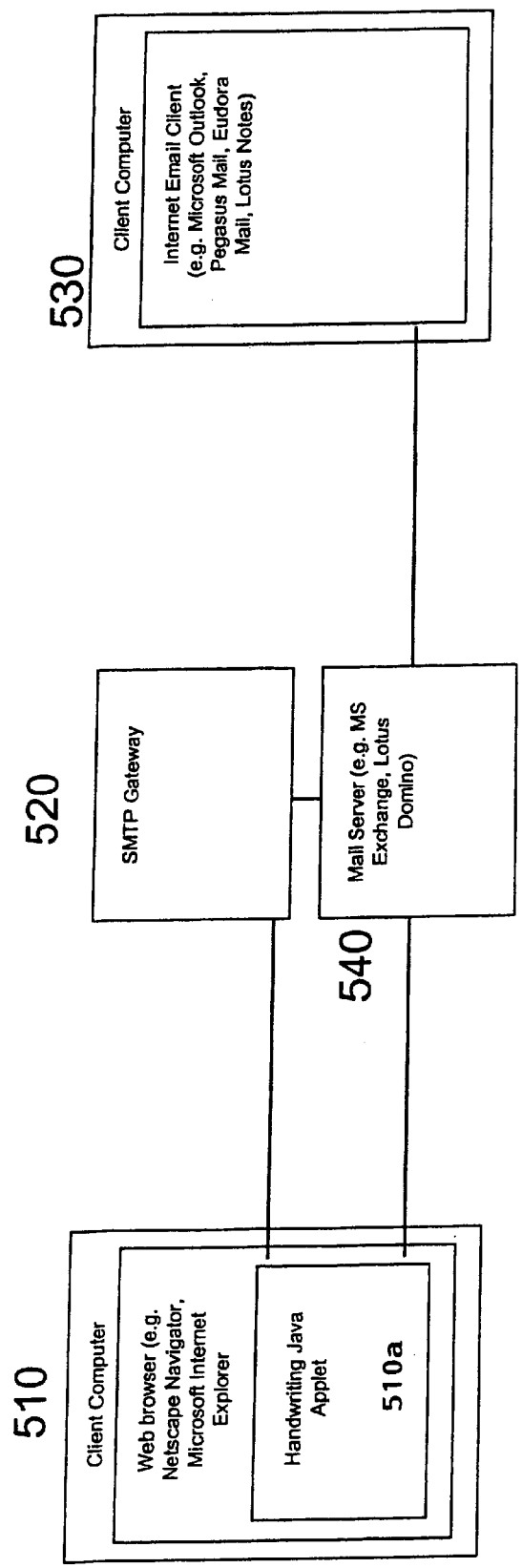
FIG. 5 is a schematic illustration of the network connections of an Internet email server version of the graphical email system.

With reference to FIG. 5, this version of the system uses the Handwriting Java Client along with a standard Internet email mail server. In this version, the Handwriting Java Client is installed as a plug-in to the client computer's web browser and operates as described before, and there is no Handwriting Java Server component. The Handwriting Java Client 510a operates in a web browser as an installed Java applet on the client computer 510. The applet 510a provides a drawing editor/viewer to compose and view handwritten messages. The Handwriting Java Client formats the message and stores it as pixel data until it is ready to be sent. The message is addressed using Javascript fields on the Web browser form in which the Java applet is embedded. The pixel image is converted into a GIF file and attached to the email message. The Java applet 510a communicates with the Mail Server computer 540 either directly or through an SMTP gateway computer 520. The Mail Server 540 sends the email message with encapsulated GIF image directly to the recipient's client computer 530, and the recipient views the attached GIF file using whatever GIF viewer they have available on their computer.

Handwriting Java Client and Wireless Internet Email Server Version

Figure 6:
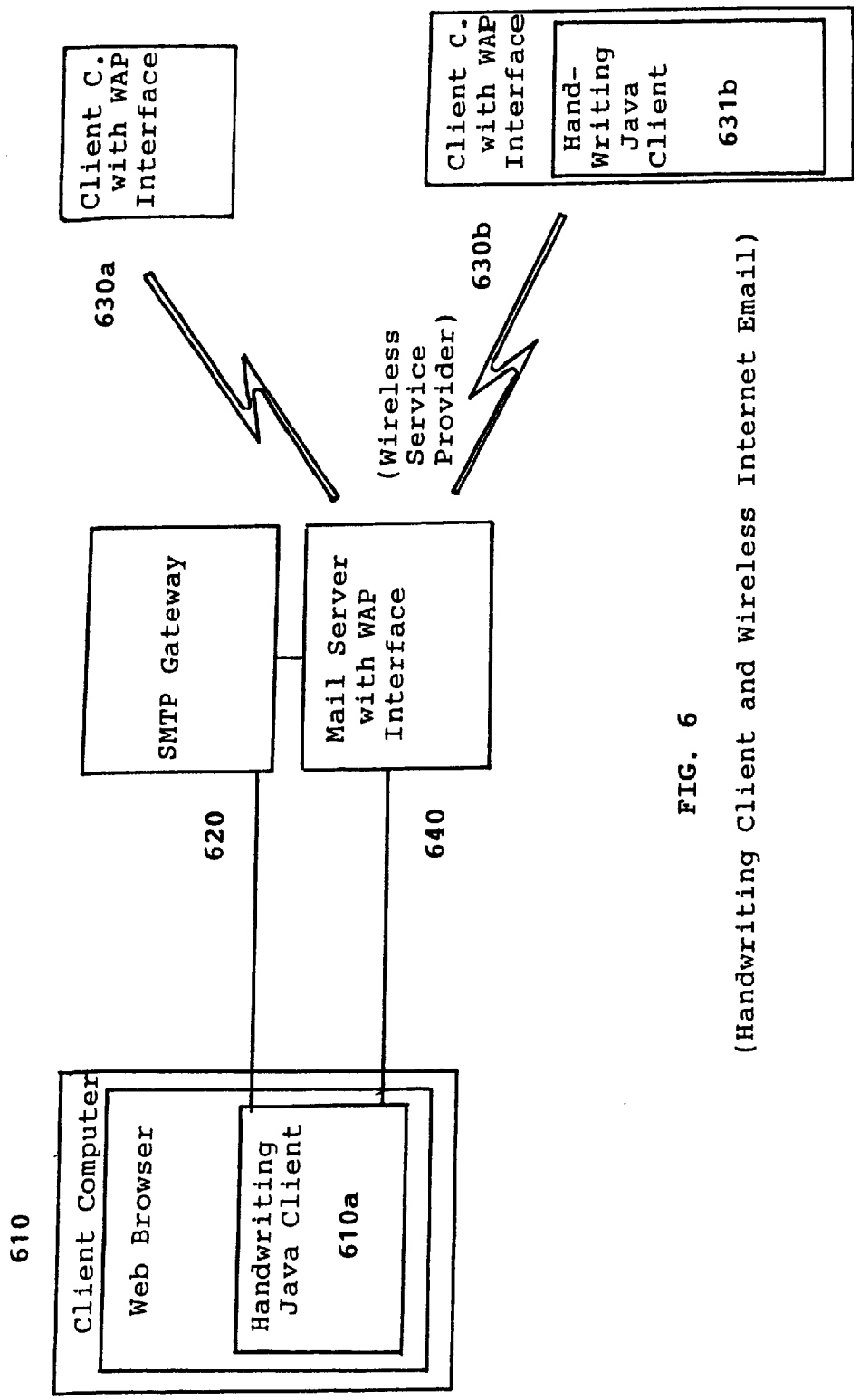
FIG. 6 is a schematic illustration of the network connections of a WAP-enabled cellphone or PDA version of the graphical email system.

With reference to FIG. 6, this version of the system uses the Handwriting Java Client along with a standard Internet email mail server providing email service to wireless client computers, such as WAP-phones and PDAs. As before, the Handwriting Java Client 610a operates in a web browser as an installed Java applet on the client computer 610. The email message is formatted with the handwritten image converted into an attached GIF file. The Java applet 610a communicates with the Mail Server computer 640 either directly or through an SMTP gateway computer 620. The Mail Server 640 includes a Wireless Application Protocol (WAP) interface which sends the email message with encapsulated GIF image through a Wireless Service Provider having WAP handling capability to the recipient.

The recipient's computer can be a thin client 630a such as a digital cellphone with a WAP interface for receiving the email message via Internet and displaying the GIF file via its mini-web browser. Alternatively, the client computer may be a more robust, mobile client computer 630b such as a Palm Pilot™ or similar type of PDA, which has the memory and CPU capacity to have a Handwriting Java Client installed with its web browser and use it for composing and sending handwriting email messages as well as viewing them. The mobile client computer can then use the Handwriting Java Client to format the handwritten message as an attached GIF file (described in the Internet Email Server version) or as pixel data sent with the email for viewing by another client computer having a Handwriting Java Client running in its web browser (as described in the Real-Time Server version).

A handwriting messaging application written for a palm-top or PDA device would currently have to be written in C or C++ because there are no current Java Virtual Machine adaptations that can be used for such devices. However, several efforts are underway to create such Java VM modules for palm-top and PDA devices. Using C/C++ to write full applications on palm-top devices has the current advantage that the security sandbox imposed on Java applets does not exist, thereby allowing a wider variety of messaging applications to be written, as long as actual implementations are kept simple (due to low CPU power and memory storage availability). The handwriting client can be kept simple by including only pen and eraser tools and different line thicknesses. Only palm-top devices with color displays would need a color palette; black and white palm-top devices would dither incoming messages to black and white while sending only two-color images. Since the client is written in C or C++, networking would be limited to standard TCP/IP communications instead of Java's RMI. For communications through a proxy, packets can be wrapped in HTTP and sent through an HTTP proxy. If a handwriting server component is used with the palm-top devices, it would remain largely the same as described above, except that it would handle only standard TCP/IP communications, and would add the ability to receive messaging information wrapped in HTTP packets from behind a firewall.

The functions of the module of the client component which converts and sends the handwritten message for handling as an email message depends upon the configuration of the system. If the system is configured with a Lotus Domino server on a Java VM platform, then the captured handwriting data is sent as a message to the Domino server in the form of a stream of pixel data which is converted by the server to a Graphics Interface Format (GIF) file and appended with an email header to form an email message handled by the server's email service. If the system is configured with a standard type of Internet email server, then the captured handwriting data can be converted at the client computer to a GIF file and sent as an email message to the Internet email server. If the system is configured for real time messaging between client devices, the client device can send the handwritten message as a GIF file appended to standard email, or send it as pixel data to a real-time messaging server which provides real-time messaging service between client devices.

Figure 7A:
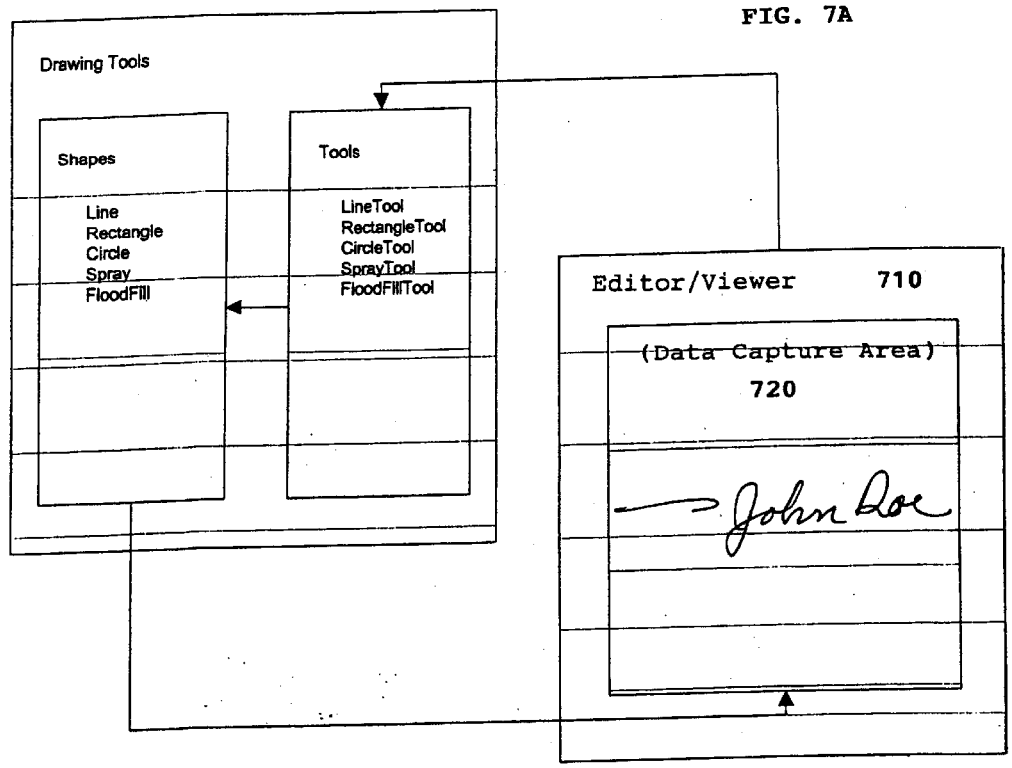
FIG. 7A is a schematic illustration of the user interface for the graphical data capture and drawing functions of the graphical email system.
Figure 7B:
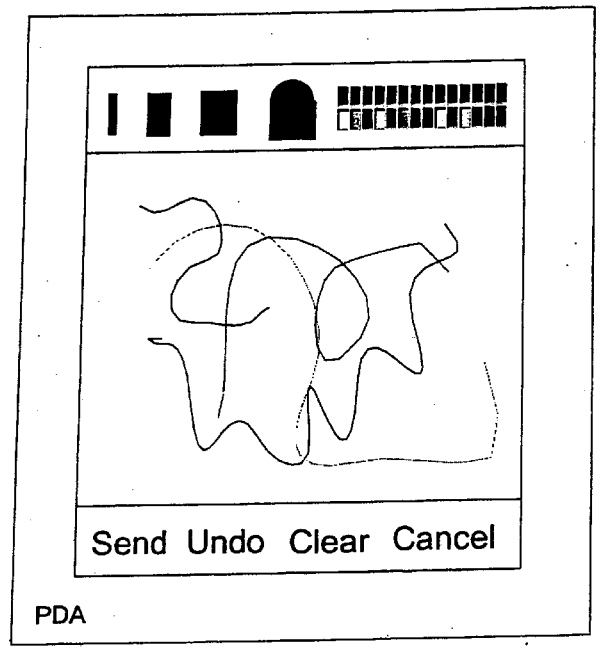
FIG. 7B is an example of an editor/viewer interface for the graphical email system on a personal digital assistant (PDA).

In FIG. 7A, the user interface for the drawing editor/viewer of the Handwriting Java Client is illustrated. For composing a handwritten message, the editor/viewer 710 has a graphical data capture area 720 in which handwritten input can be entered with a touch pen or on a stylus pad and captured as pixel data. The editor/viewer 710 can offer a suite of standard types of drawing tools such as making line, circle, or polygon shapes and spraying and filling image areas. The graphical data capture area 720 is also the graphical image viewing area for email received with an attached GIF file or pixel data. In FIG. 7B, a typical layout for a PDA of the editor/viewer interface with drawing tools and color palette is illustrated.

Handwriting Client and Wireless Real Time Server Version

The version of the system illustrated in FIG. 6 may be modified for real-time messaging between PDAs and mobile communication devices of the "always on" type that are connected to a real-time server through an Internet Wireless Service Provider, rather than a WAP-type phone interface. Examples of "always-on" types of Internet wireless messaging include Research in Motion's (RIM's) BlackBerry™ pager email devices, Motorola Timeport™ P935 Personal Communicator, or the Palm's announced i705 wireless device with always-on access to email.

Similar to the sequence outlined above for the Handwriting Java Client and Real Time Server Version, the always-on wireless messaging device is provided with a handwriting client that sets up a handwriting (e.g., stylus) data capture area in the device to capture the sender's handwriting input and send it as an attachment with a wireless email or message transmission. The wireless service provider employs a real-time server that receives the wireless email or message through the appropriate wireless Internet service interface and routes the message to a private mail or message repository for the intended recipient. If the recipient has an always-on device, the message in that person's private repository is sent to the recipient's device through wireless transmission, where it pops up as a message in the device display. With a handwriting viewer or a mode for viewing attached graphics files, the recipient sees the message instantaneously as handwriting.

The wireless real-time server version allows people to communicate privately and personally by instantly sending handwriting and other graphical data to each other. The handwriting client has utilities to allow a user to maintain an address book of people they wish to communicate with. When the user logs on to the real time server, they are authenticated with a user name and password and are registered as an active user. The handwriting client allows the user to see other users that are currently on-line and to initiate a private, real time communication session with an on-line user. The handwriting client accepts handwritten and other graphical messages, packages the data in a message and sends it to the recipient. The recipient receives an audible notification that they have a message and is able to view the message in their handwriting client. The recipient is also able to reply to the sender by composing a new handwriting message or copying and writing over the original message that was received. This person-to-person communication can continue back and forth, effectively allowing the parties to communicate using handwriting and drawings.

This method of instantly sending handwriting between to parties differ from other real time communication systems such as chat sessions and systems commonly referred to as "electronic whiteboards" and "instant messaging systems" in the following ways.

1. Private message pools for graphical messages: In the invention, graphical messages to be sent to a recipient are stored in the recipient's private message pool and not a shared, common pool. The recipient's client software polls their personal pool and not a common area. This method supports private, one-on-one communications similar to email, except in real time. Chat rooms and whiteboards are intended for group communication and incorporate shared message pools.
2. Graphical handwriting client: The invention allows users to communicate using handwriting input rather than text input. The handwriting client is essentially a graphics input editor implemented in Java which communicates with a real time server. The real time server converts the input data into a real time messaging format that is stored in a repository location and retrieved by the recipient's client.
3. Control over when message is sent: In the invention handwriting messages are composed privately in the handwriting client and sent on demand by the sender, similar to how standard text email is composed locally and sent on demand. Whiteboard systems send graphical data in real time as they are drawn to all users that are viewing the whiteboard.

The wireless real time server version may also be implemented on portable PDA devices and mobile phones that use the Short Messaging Service (SMS) or Enhanced Messaging Service (EMS) for wireless instant messaging on wireless phone service. SMS and EMS now permit graphics attachments to be sent with messages. The handwriting client software can be implemented to run on these mobile devices using a micro or personal Java platform that are becoming available on these devices. The real-time server can correspondingly be adapted with an interface to support handwriting messages sent through the messaging formats used by these mobile messaging devices.

Handwriting Java Client for MMS Messaging in Cellphone Network Version

In FIG. 8, the MMS Cellphone Messaging version of the handwriting messaging system allows people to communicate privately between MMS capable terminals by composing and sending handwriting and other graphical data to each other. The originator composes a handwriting message using a pen device connected to the handset and addresses the message to the receiver. An MMS compliant message is created and sent to an MMS Center (MMSC) that is provided by the originator's wireless service provider. The MMSC attempts to forward the message to the receiver. If the receiver is unavailable, the MMSC stores the message and delivers the message later. If the message cannot be delivered within a certain amount of time, the message is discarded.

MMS is becoming a standard method for sending and receiving multimedia content over wireless networks. Just as our original invention took advantage of standard methods for sending SMTP based email between computers, the same principle can be implemented for digital wireless phone devices and Internet-capable phones (I-phones) using a digital messaging protocol, such as the now standard MMS protocol (as published by the MMS Conformance Group), for wireless mobile devices. The handwriting client software can readily be implemented to run on mobile devices using the Java 2 Micro Edition (J2ME) platform that are becoming commonly available on these devices.

The Java client software is programmed to set up the graphical data capture input area in the client device and capture the graphical (pixel) data for conversion to a standard format such as jpeg or gif handled by the digital messaging protocol used in digital phone devices or I-phones. For example, the MMS protocol can support jpeg and gif files converted by the handwriting client application in the following manner. While the user is drawing with a stylus or pen on the graphical data capture area, the pixel data representing the drawing are stored in local memory in the client device. The user can address the handwritten message to a recipient using Javascript fields of the graphical interface in which the Java handwriting client is embedded. When the SEND MESSAGE command is selected by the user, the Handwriting Java Client formats a message with the pixel data in gif format to the Handwriting Java Server, which then processes the message and sends it to the MMS-compliant client device of the recipient using the MMSC server protocol.

Figure 9:
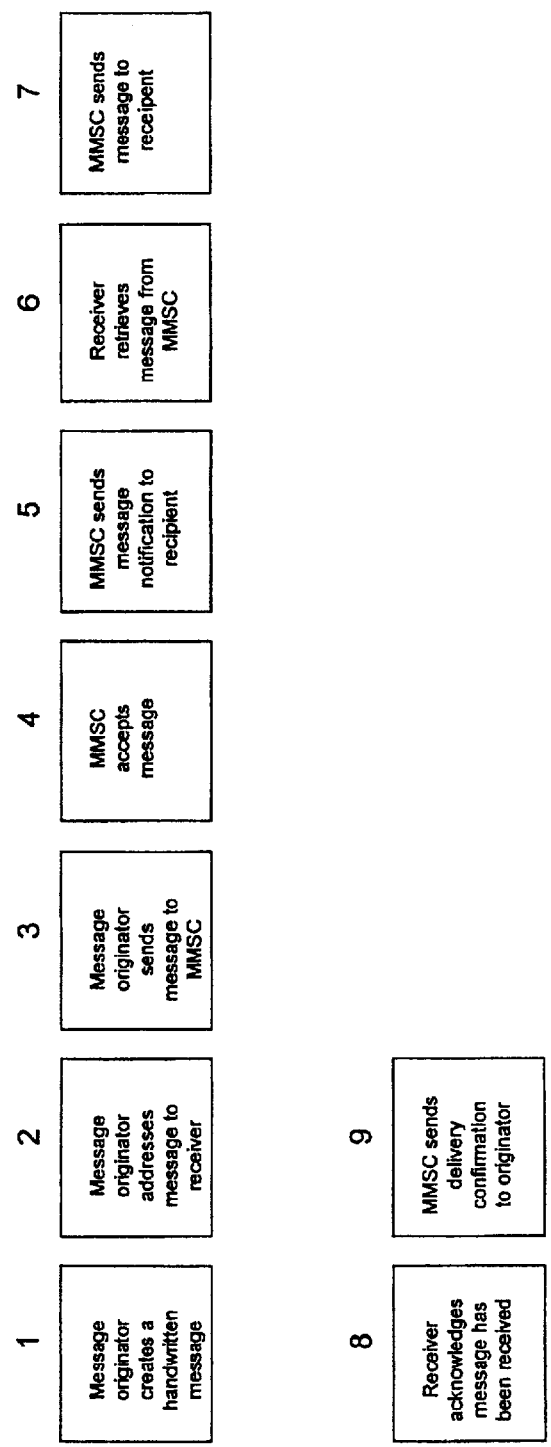
FIG. 9 is a block diagram illustrating the operational sequence for the handwritten messaging system.

In FIG. 9, the steps involved with sending a handwritten message and viewing it by the recipient are illustrated using MMS-compliant mobile phone devices.

1. The handwriting client software is used to compose a handwritten message. The handwriting client software is running in a J2ME environment that is available on mobile devices. The mobile phone also has a pen enable screen or an attached pen pad device that captures the user's pointer movements. The handwriting client software allows the users to select drawing tools and captures the handwriting image created by the pointer movements. Images can be captured with the mobile devices camera or downloaded as a background graphic that can be annotated with handwriting and is included in the message.

2. The originator addresses the message to the recipient(s).
3. The originator's terminal contains information about the wireless provider's MMSC, initiates a Wireless Access Protocol (WAP) connection and sends the handwriting message as the content of the WSP POST command
4. The MMSC accepts the message and responds to the originator over the same WAP connection. A "message send" indicator is displayed on the originator's terminal.
5. The MMSC uses WAP PUSH command to attempt to send an indication message to the receiver.
6. The receiver's terminal initiatives a WAP connection and uses the WSP GET command to retrieve the handwritten message from the MMSC.
7. Handwritten message is sent to the receiver's terminal as content of a WSP GET RESPONSE command over the same WAP connection. The receiver's terminal indicates, "Message received"
8. The receiver's terminal acknowledges receipt with WSP POST command over the same WAP connection.
9. The MMSC uses WAP PUSH command to indicate to originators that message was delivered. The originator's terminal indicates, "Message delivered".

Figure 10:
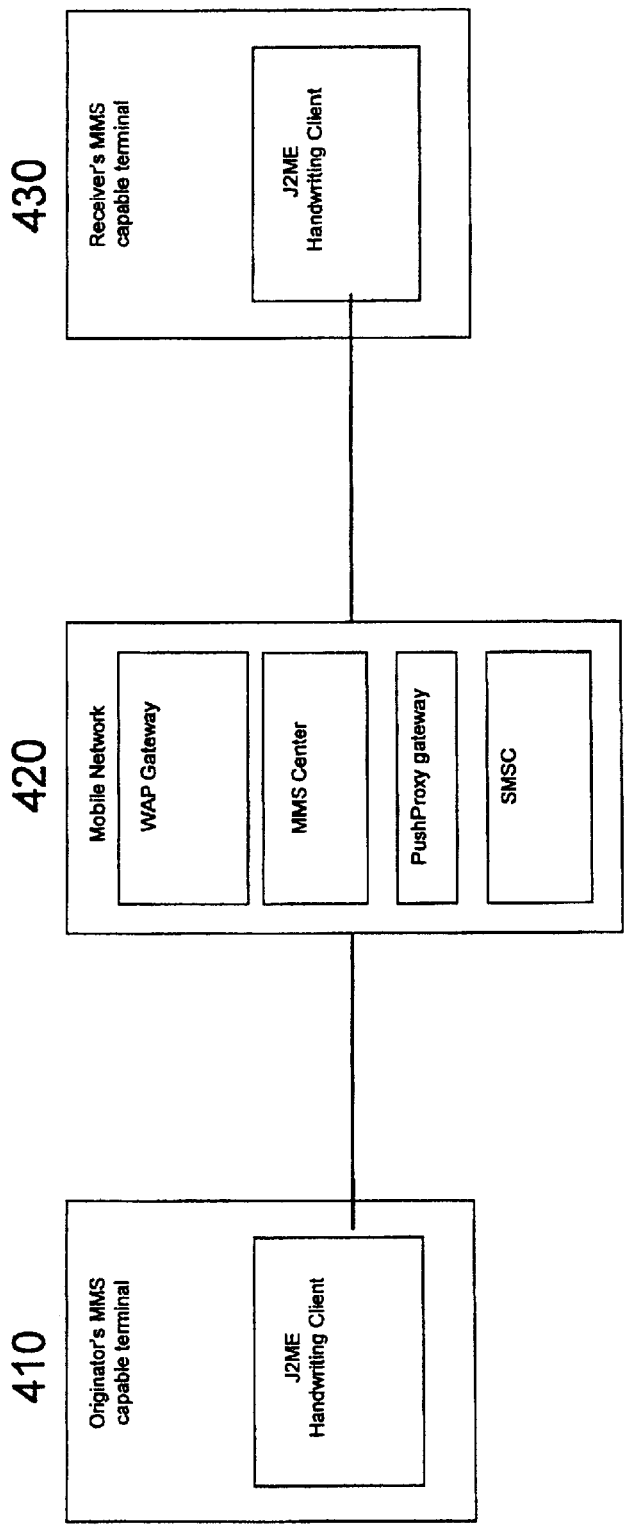
FIG. 10 is a schematic diagram of the interconnection of components of the handwritten messaging system.

In FIG. 10, the interconnection of components of the present MMS handwritten messaging version is illustrated. The sender's wireless or digital cellphone device 410 has a J2ME handwriting client installed for capturing handwritten input as graphical data and sending it as an MMS message using the standard MMSC protocol. The MMS message is received at a mobile network center 420 which includes a WAP gateway, and MMS (message processing) center, a PushProxy gateway and SMSC transmission protocol. The MMS message from the sender is "pushed" to the recipient's wireless or digital cellphone device 430 which similarly has a J2ME handwriting client installed for viewing (and sending back replies to) the MMS message. The recipient can thus view the handwritten message as a graphical image on the mobile receiving device.

It is understood that many other modifications and variations may be devised given the above description of the principles of the invention. It is intended that all such modifications and variations be considered as within the spirit and scope of this invention, as defined in the following claims.

I claim:

1. A multimedia messaging system operable on a wireless or digital cellphone network comprising:
   (a) a server component operable on a server computer on the network with multimedia messaging server for receiving an electronic message sent from a sender and sending it to a recipient to whom it is addressed,
   (b) a remote client device for the sender connectable to the server computer through an online data connection to the network, and a client messaging component operable on the remote client device for setting up a graphical data capture area in a visual interface of the remote client device, said client messaging component including a graphical input device that is operatively coupled to the graphical data capture area for allowing the user to enter handwritten or handdrawn input through the graphical input device, and for capturing the handwritten or handdrawn input as graphical data and sending it as an electronic message to the multimedia messaging server component via the network for sending to the recipient addressed, and
   (c) at least another remote client device for the recipient connectable to the server computer through an online data connection to the network, having a utility for receiving the electronic message sent to the recipient by the server component and viewing it as a handwritten or handdrawn message.

2. A multimedia messaging system according to claim 1, wherein the client messaging component is operable for also setting up a graphical data viewing area for viewing electronic messages with graphical data sent by the server component.

3. A multimedia messaging system according to claim 1, wherein the client messaging component is a Java applet installed on the remote client device.

4. A multimedia messaging system according to claim 1, wherein the remote client device is a digital cellphone device supporting a multimedia messaging protocol.

5. A multimedia messaging system according to claim 1, wherein the remote client device is a wireless mobile communication device supporting a multimedia messaging protocol.

6. A multimedia messaging system according to claim 1, wherein the client messaging component converts the input graphical data to a graphical data attachment to a multimedia messaging format message.

7. A multimedia messaging system according to claim 1, wherein the client messaging component converts the input graphical data to a graphical data attachment to an instant messaging format message.

8. A multimedia messaging system according to claim 1, wherein the client messaging component converts the input graphical data to a graphical data attachment to email.

9. A multimedia messaging system according to claim 1, wherein the client messaging component converts the input graphical data to a graphical data attachment to a cellphone messaging format message.

10. A multimedia messaging system according to claim 1, wherein the multimedia messaging server routes the electronic message sent from a sender to the intended recipient by a push proxy.

11. A multimedia messaging method comprising:
   (a) providing a graphical data capture area in a visual interface operable in a client messaging component of a remote client device having an online connection to a network, and a graphical input device operatively coupled to the graphical data capture area for allowing a user to enter handwritten or handdrawn input;
   (b) composing an handwritten or handdrawn message on the remote client device for a sender via the graphical data capture area and graphical input device, capturing it as graphical data, and sending it as an electronic message in a multimedia messaging format on a network having a multimedia messaging server component operable on a server computer which supports the MMS messaging for sending it to a recipient to whom it is addressed; and
   (c) receiving via the multimedia messaging server component an electronic message in the multimedia messaging format sent from a sender and sending it to a remote client device for a recipient to whom it is addressed.

12. A multimedia messaging method according to claim 11, wherein the client messaging component is operable for also setting up a graphical data viewing area for viewing electronic messages with graphical data sent by the server component.

13. A multimedia messaging method according to claim 11, wherein the client messaging component is a Java applet installed on the remote client device.

14. A multimedia messaging method according to claim 11, wherein the remote client device is a digital cellphone device supporting the multimedia messaging format.

15. A multimedia messaging method according to claim 11, wherein the remote client device is a wireless mobile communications device supporting the multimedia messaging format.

16. A multimedia messaging method according to claim 11, wherein the client messaging component converts the input graphical data to a graphical data attachment to email.

17. A multimedia messaging method according to claim 11, wherein the client component converts the input graphical data to a graphical data attachment to an instant messaging format message.

18. A multimedia messaging method according to claim 11, wherein the client component converts the input graphical data to a graphical data attachment to a multimedia messaging format message.

19. A multimedia messaging method according to claim 11, wherein the client messaging component converts the input graphical data to a graphical data attachment to cellphone messaging format message.

20. A multimedia messaging method according to claim 11, wherein the multimedia messaging server component routes the electronic message sent from a sender to the intended recipient by a push proxy.

* * * * *